O. A. MYGATT.

COMPOSITE REFLECTOR FOR LIGHT RAYS.

APPLICATION FILED JUNE 6, 1910.

Reissued Sept. 26, 1911.

13,293.

2 SHEETS—SHEET 1.

WITNESSES

Chas. H. Davis

E. A. Shannon

INVENTOR

Otis A. Mygatt by Brock Buckner & Smith

Attorney

O. A. MYGATT.

COMPOSITE REFLECTOR FOR LIGHT RAYS.

APPLICATION FILED JUNE 6, 1910.

Reissued Sept. 26, 1911.

13,293.

2 SHEETS—SHEET 2.

WITNESSES

[illegible]

[illegible]

INVENTOR

Otis A. Mygatt by Brock Baker & Smith

Attorney.

UNITED STATES PATENT OFFICE.

OTIS A. MYGATT, OF NEW YORK, N. Y.

COMPOSITE REFLECTOR FOR LIGHT-RAYS.

13,293. Specification of Reissued Letters Patent. Reissued Sept. 26, 1911.

Original application filed March 10, 1906, Serial No. 305,301. Renewed September 24, 1908, Serial No. 454,541. Original No. 957,703, dated May 10, 1910. Application for reissue filed June 6, 1910. Serial No. 565,421.

*To all whom it may concern:*

Be it known that I, OTIS A. MYGATT, a citizen of the United States, residing at New York, in the county of New York and State of New York, have invented certain new and useful Improvements in Composite Reflectors for Light-Rays, of which the following is a specification, reference being had therein to the accompanying drawing.

This invention relates to glass structures for directing and blending light rays, by means of a combination of prisms and of colored surfaces.

The object of the invention is to combine in one glass structure a reflector wherein the light rays shall be reflected from a portion of the reflector body by the action of prismatic surfaces on the body (or specular reflection) as usual in prismatic glass reflectors, and in which reflection from another part of the body shall be effected by the use of a colored material which is itself a reflector by reason of its color, and in which a combination of both characters of reflection may be effected.

Figure 1:
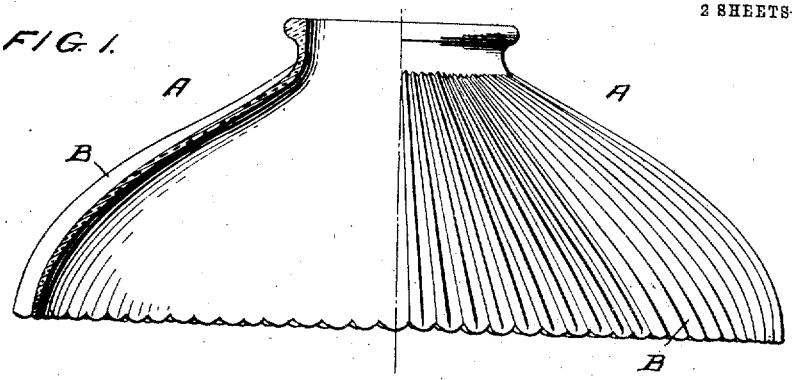
Figure 2:
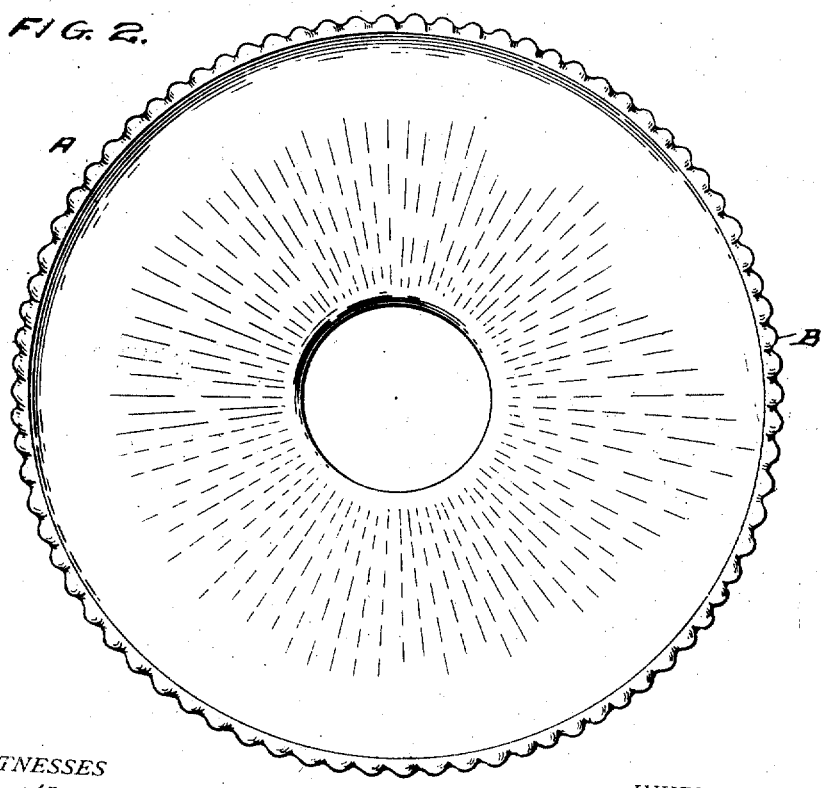
Figure 3:
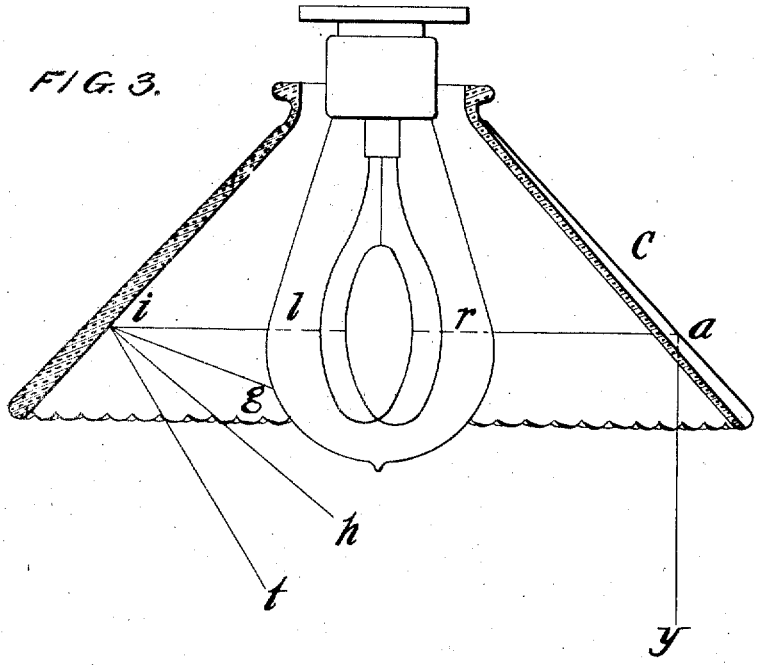
Figure 4:
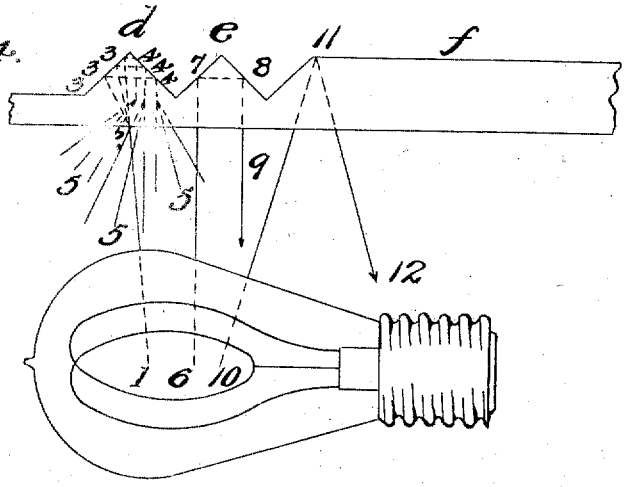

Figure 1 is a partial elevation and partial section of a reflector intended to illustrate my invention. Fig. 2 is a bottom or inside view of the same. Fig. 3 is a vertical section of a reflector and lamp, showing the course of some light rays. Fig. 4 is a diagram illustrating the course of some light rays through strata of different colored glass, and the action of prisms on such rays.

In prismatic glass reflectors all the light rays reflected from the planes of the prisms are in defined and absolute directions, the angle of incidence and the angle of reflection being equal, and a prismatic glass reflector can be, and generally is, constructed to direct a definite proportion of the light which it receives in a determined and well defined direction, due in part to the form of the reflector body and in part to the form of the prisms thereon.

In such reflectors as act by reason of the color of the material, the quantity of light reflected depends mainly on the color of the reflecting material, and possibly somewhat on the polish of the surface of such material. The direction of such reflection depends mainly on the position of the reflecting body, and the reflected rays are not sharp and definite as when reflected from a prism, but are more or less blended and diffused. Taking advantage of these known laws of optics, I produce a reflector in which a combination of specular and color reflection is effected. For example: I press in a mold a prismatic glass reflector of any known form, say the form shown at A, Fig. 1. This reflector is composed of what is known as flash opal glass, that is, a quality of glass which is quite transparent or of the quality of crystal glass when pressed, but which can be flashed or fire-heated afterward and thus caused to change color, then assuming the white hue known as opal glass. Reflecting prisms B, constructed with planes at the usual angles to secure reflection of light rays, are formed by pressure in a proper mold. Viewed from inside, as in Fig. 2, the prisms will gradually disappear as they merge into the opal. See dotted lines. The pressed glass reflector before flashing will appear the same as any usual crystalline prismatic glass reflector composed of transparent glass, and will have the same action on light rays. After the reflector is pressed of this material the portion which is to be opalized is "flashed" in a furnace. Generally the portion so flashed is the rim or edge of the reflector. When exposed to the full heat of the furnace the portion so exposed changes color and becomes white, while that part less exposed changes to a somewhat bluish tinge, and any portion protected or but little exposed to heat remains transparent or "crystal."

The sharpness of prisms or parts of prisms exposed to the full heat of the furnace is more or less lost by the running of the glass during the flashing, so that specular reflection would be to a considerable extent destroyed, even if the glass did not change color. The sharp definition of the prisms remote from or protected from the heat is not changed by "flashing" the opaled part of the reflector.

It is not material to my invention that the prisms are partly destroyed on the whitened part of the reflector. I depend for reflection from the fully whitened part of the reflector on the color, and not on the prisms. The necessary chemical ingredients to produce such changes of color in glass are well known to glass workers.

In Fig. 3 a common form of prismatic reflector is shown, as applied to a lamp. The right hand section C of the reflector is supposed to be clear or crystal glass, that is, glass not flashed, and it has the usual reflecting prisms *c*. A light ray from the filament will pass to the prism and thence be reflected in the direction *r*, *a*, *y*, entering the glass until it is reflected by the prism *c* on the outside of the reflector, in the direction *a*, *y*, as a definite and sharply defined ray. The left hand section D of the reflector is also supposed to be covered with prisms, and for convenience the section is shown through the thickest part of the prism. This section is supposed to be opalized to a full white. Then the ray 1 will encounter the surface *i*, and will not penetrate the glass, but will be broken up and diffused in directions approximating lines *g*, *h*, *t*, and the direction of the ray will not be at all controlled by the prism, nor will it be the same as the direction *a*, *y*, on the opposite side of the reflector. It is quite possible to opalize one part of a reflector without changing another part. It is also feasible to work in other colors than white, some of which are more and some less reflective of light rays.

Fig. 4 shows, on an enlarged scale, a section E of a body of glass. Now let us suppose the body E to be but slightly opalized or tinted, so as to pass rays of light, with some obstruction, to prism *d*, but to be of crystal glass under prisms *e* and *f*. The ray 1 will encounter body E at 2, and will be partly diffused, but will reach the reflecting surface of prism *d*, say on lines 3, 3, 3. The broken ray will be directed to 4, 4, 4, and thence again through the colored stratum of E, but on the second transmission through this stratum it will be still more broken up, and pass toward 5, 5, etc., much diffused. But it is probable that the broken ray escapes in part at 3, 3, and 4, 4, because it has lost its definite character and perhaps encounters the planes of the prism at unusual angles. It is certain that beautiful opalescent effects of light appear on the prisms, and also on the inner surface of E, at 5, 5.

The light rays 6, 7, 8, 9 and 10, 11, 12, are directed as usual by the prisms *e*, *f*, the stratum E being crystalline under such prisms.

From the above it should be understood that a prismatic glass body, partly opalized, or otherwise color changed to give reflection due to the color, not only changes the light distribution of a given shape of reflector, but gives a peculiar blending of rays in the intermediate stages between pure color reflection and pure specular reflection which is difficult to describe. Such a blending of light rays is very agreeable and restful to the eye.

If a large proportion of the reflector be preserved as a prismatic reflector, nearly the usual accuracy of light direction may be maintained. If the larger part be colorized, accuracy will be lost and softening effected.

Almost any part of the reflector may be "flashed." The prisms on the flashed part can be preserved by suitable covering, so that they are not affected by the heat of flashing, if desirable. If the flashing is intended to develop full opal white, such preservation of prisms is not essential for purposes of reflection, although prismatic opal is very ornamental.

What I claim is:

1. A reflector composed of a single piece of glass, having one portion of its body transparent and externally covered with light-reflecting prisms, and having another portion white in color and externally ribbed, the prismatic portion and the colored portion gradually blending.

2. A reflector composed of a single piece of "flash opal" glass, having a portion of its body transparent and provided with light directing prisms, and a portion "flashed" white and being light reflecting by reason of its color.

3. A glass body having on a part of its surface light-reflecting prisms, and having another part of its body reflective of light by reason of its color, these portions of the body blending gradually each into the other.

4. An integral glass body having a transparent portion reflective of light, and a portion reflective by reason of its color merging or blending with the transparent portion.

5. A reflector composed of a single piece of glass having one portion of its body transparent and ribbed, and having another portion white in color, the two portions gradually blending toward each other.

6. A glass reflector having a portion of its body transparent and ribbed, and a colored portion reflective of light by reason of its color.

7. A glass body having its surface reflective of light by reason of its contour and the body of the glass reflective of light by reason of its color.

8. A glass body having a part of its surface of transparent material reflective of light and a part of its body developed in a color through which the light rays pass to the surface reflective of light with obstruction, and are again reflected by said surface through the color.

9. A glass body having its surface provided with double reflecting prisms and its body developed in a color through which the light rays pass to the prisms with obstruction and are again reflected through the colored body by the prisms.

In testimony whereof I affix my signature in presence of two witnesses.

OTIS A. MYGATT.

Witnesses:
H. C. Coxe,
H. Bexley.

BEST AVAILABLE COPY